US012676166B1

(12) United States Patent
Bekal Kannangola et al.

(10) Patent No.: US 12,676,166 B1
(45) Date of Patent: Jul. 7, 2026

(54) CONTEXT INCLUSIVE INTERRUPTION CLASSIFICATION FOR DIALOG DRIVEN SYSTEMS

(71) Applicant: Amazon Technologies, Inc., Seattle, WA (US)

(72) Inventors: Dhanush Bekal Kannangola, Seattle, WA (US); Katrin Kirchhoff, Seattle, WA (US); Sravan Babu Bodapati, Redmond, WA (US); Kartik Rustagi, Sammamish, WA (US); Anubhav Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 17/548,416

(22) Filed: Dec. 10, 2021

(51) Int. Cl.
| | |
|---|---|
| *G10L 25/78* | (2013.01) |
| *G06N 3/04* | (2023.01) |
| *G06N 3/088* | (2023.01) |
| *G10L 15/26* | (2006.01) |

(52) U.S. Cl.
CPC ............... *G10L 25/78* (2013.01); *G06N 3/04* (2013.01); *G06N 3/088* (2013.01); *G10L 15/26* (2013.01)

(58) Field of Classification Search
CPC ........... G10L 25/78; G10L 15/26; G06N 3/04; G06N 3/088
See application file for complete search history.

(56) References Cited

U.S. PATENT DOCUMENTS

| | | | | |
|---|---|---|---|---|
| 8,046,221 | B2 * | 10/2011 | Ljolje | G10L 15/22 369/25.01 |
| 8,180,025 | B2 * | 5/2012 | Pieraccini | H04M 3/493 340/7.51 |
| 8,660,843 | B2 | 2/2014 | Falcon et al. | |
| 9,020,823 | B2 | 4/2015 | Hoepken et al. | |
| 9,460,717 | B2 | 10/2016 | Kim et al. | |
| 11,252,149 | B1 | 2/2022 | Bang et al. | |
| 11,551,685 | B2 * | 1/2023 | Rastrow | G10L 15/1815 |
| 11,605,384 | B1 * | 3/2023 | Dalton | G10L 15/08 |
| 2021/0295833 | A1 * | 9/2021 | Rastrow | G10L 15/1815 |
| 2022/0093093 | A1 * | 3/2022 | Krishnan | G10L 15/24 |

OTHER PUBLICATIONS

Y.-S. Chuang, et al., "Speechbert: An audio-and-text jointly learned language model for end-to-end spoken question answering," arXiv preprint arXiv:1910.11559 (Year: 2019).*

(Continued)

*Primary Examiner* — Bhavesh M Mehta
*Assistant Examiner* — Nandini Subramani
(74) *Attorney, Agent, or Firm* — S. Scott Foster; Kowert, Hood, Munyon, Rankin & Goetzel, P.C.

(57) ABSTRACT

A dialog driven system may implement context inclusive interruption detection. During an audio presentation of a dialog generated by a dialog driven system, a voice audio may be detected. A context inclusive encoding may be generated for the voice audio, such as an acoustic encoding of the voice audio. The context inclusive encoding may be used to apply a machine learning model to classify whether the detected voice audio is a true interruption or a false interruption. False interruptions may allow the audio presentation to continue. True interruptions may stop audio presentation to process the voice audio as a response to the dialog.

20 Claims, 11 Drawing Sheets

(56)     References Cited

OTHER PUBLICATIONS

Hsu, Wei-Ning, et al. "Hubert: Self-supervised speech representation learning by masked prediction of hidden units." IEEE/ACM Transactions on Audio, Speech, and Language Processing 29 (2021): 3451-3460 (Year: 2021).*

N. Strom and S. Seneff, "Intelligent barge-in in conversational systems." in Interspeech, 2000, pp. 652-655 (Year: 2000).*

Chung, Yu-An, Chenguang Zhu, and Michael Zeng. "Splat: Speech-language joint pre-training for spoken language understanding." arXiv preprint arXiv:2010.02295 (2020). (Year: 2020).*

Selfridge, Ethan, et al. "Continuously predicting and processing barge-in during a live spoken dialogue task." Proceedings of the SIGDIAL 2013 Conference. 2013 (Year: 2013).*

U.S. Appl. No. 17/039,889, filed Sep. 30, 2020, Swapandeep Singh, et al.

U.S. Appl. No. 17/039,900, filed Sep. 30, 2020, Swapandeep Singh, et al.

* cited by examiner

_end user_
_dialog input 150_

_system-side dialog_
_prompts 160_

_end user_
_dialog input 150_

_system-side dialog_
_prompts 160_

Scenario A: No attempt by client to interrupt audio presentation of application-generated output

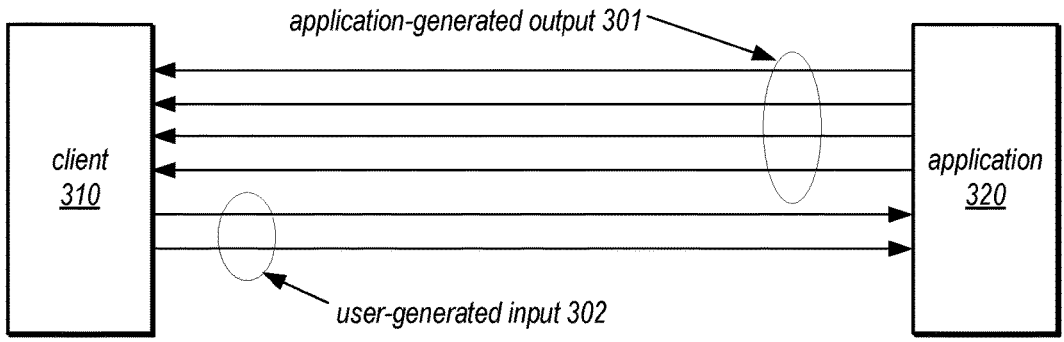

application-generated output 301 client 310 application 320 user-generated input 302

Scenario B: Client interrupts during audio presentation of application-generated output, interrupt classified as true

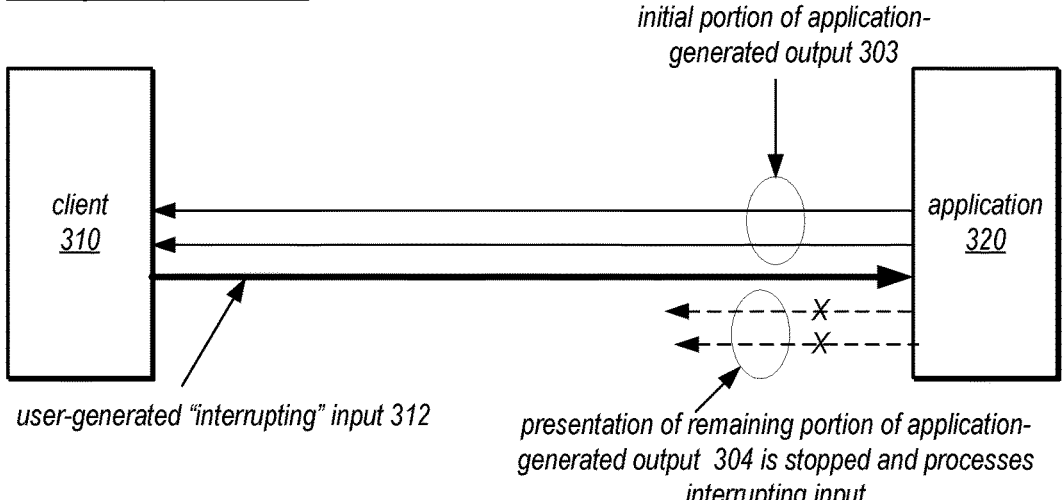

initial portion of application-generated output 303 client 310 application 320 user-generated "interrupting" input 312 presentation of remaining portion of application-generated output 304 is stopped and processes interrupting input

Scenario C: Client interrupts during audio presentation of application-generated output, interrupt classified as true

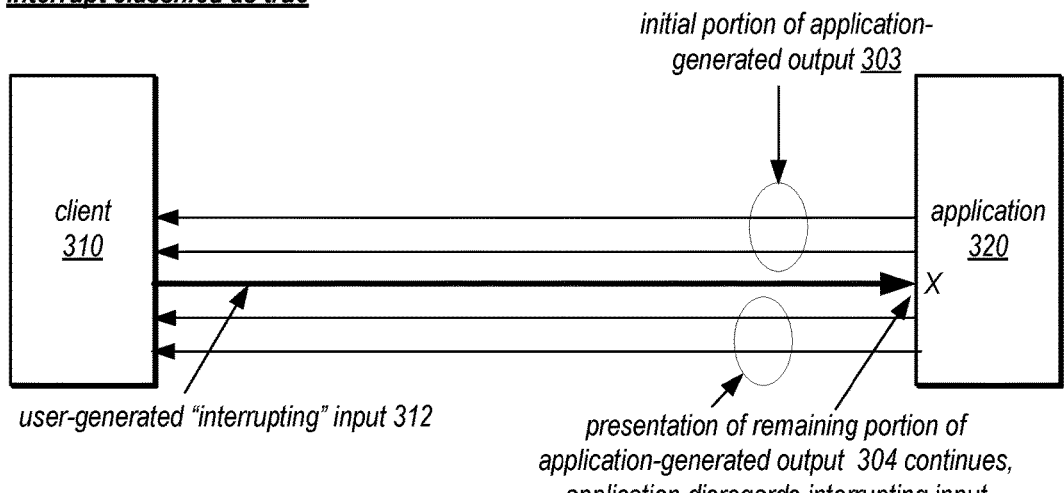

initial portion of application-generated output 303 client 310 application 320 user-generated "interrupting" input 312 presentation of remaining portion of application-generated output 304 continues, application disregards interrupting input

*FIG. 3*

CONTEXT INCLUSIVE INTERRUPTION CLASSIFICATION FOR DIALOG DRIVEN SYSTEMS

BACKGROUND

Over recent years, the number of small-footprint sensor-containing devices such as smart phones, wearable devices, personal assistant devices and various other "Internet of Things" (IoT) devices which can be used for accessing a variety of distributed or remote applications have been increasing dramatically. Many of these devices comprise sensors capable of detecting voiced commands. The small-footprint devices are often designed to communicate with server farms at data centers which can be used to perform application tasks based on the input provided via the devices.

In principle, the proliferation of devices that can collect voice signals increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Users may typically prefer to use conversational or "natural" language to express their commands or intentions, in a manner similar to the way they would interact with other individuals, rather than being restricted to using specific "canned" phrases in a certain sequence. Applications which are designed to interact conversationally with users may be referred to as dialog-driven applications.

The interpretation of the signals received via the sensor-containing devices is a complex problem, especially in scenarios in which customers are allowed to express themselves informally or conversationally. To interpret arbitrary voice commands, for example, sophisticated automated speech recognition (ASR) algorithms and/or natural language processing (NLP) algorithms may need to be employed. In many cases, in order to fulfill a particular task being requested by a customer, it may not be sufficient to interpret just one set of voiced words; instead, a back-and-forth interaction may be needed to determine various aspects of the user requirements. Different users may have different preferences and behaviors regarding their interactions with a given dialog-driven application. Thus, managing interactions between a dialog-driven application and diverse clients remains a non-trivial technical challenge.

BRIEF DESCRIPTION OF THE DRAWINGS

FIG. 3 illustrates logical block diagrams of interrupt handling, according to some embodiments.

Figure 1A:
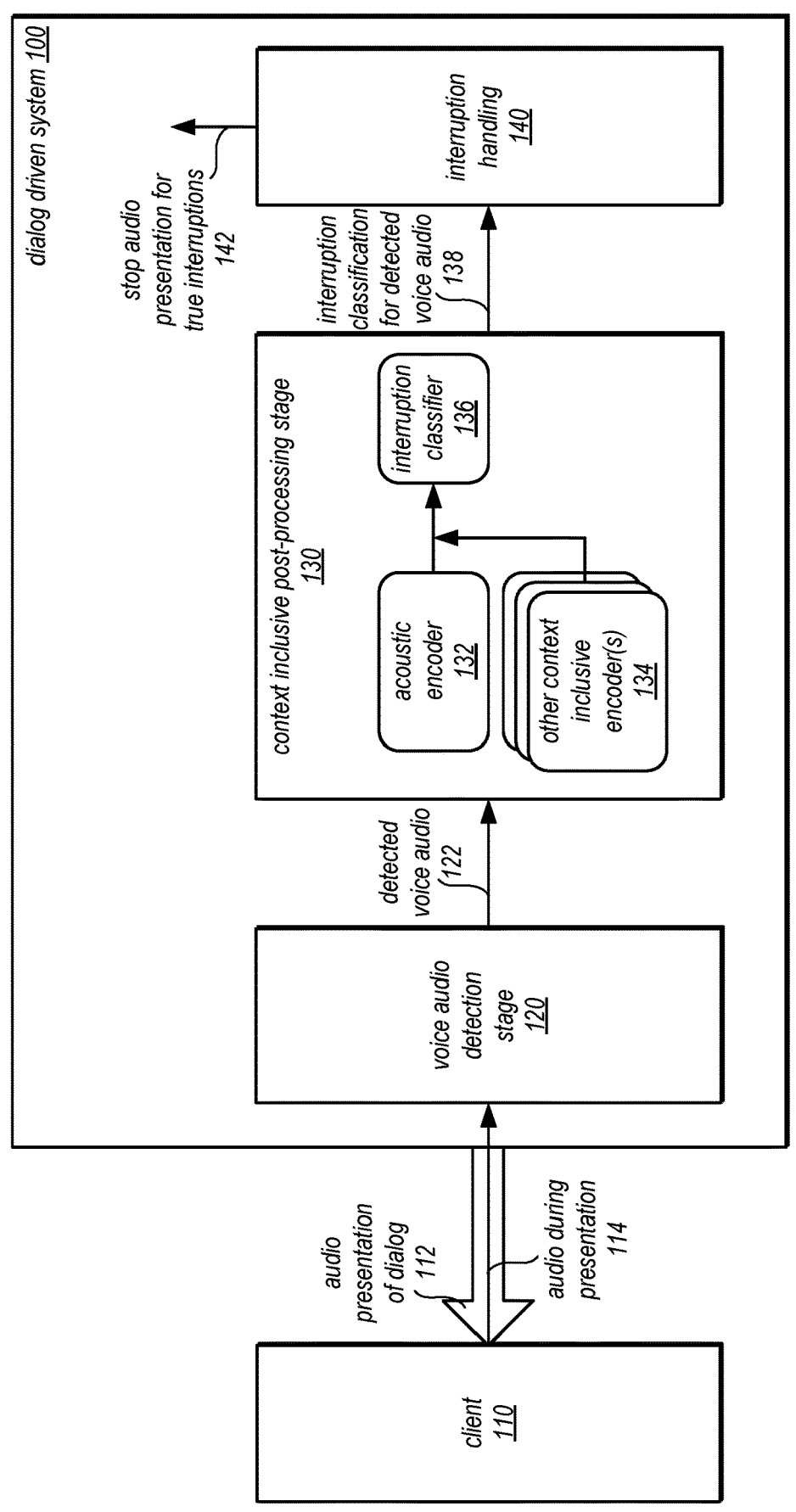
FIG. 1A illustrates a logical block diagram of context inclusive interruption handling for dialog driven systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for context inclusive interruption handling for dialog driven systems are described herein. Users may interact with dialog driven systems through various requests and responses to voice prompts. Interrupt handling may be implemented as part of dialog driven systems to allows users participating in a voice interaction with the dialog driven system to interrupt an audio presentation of dialog generated by the dialog driven system while it is still being presented. While some techniques implement this feature by utilizing a voice activity detection technique alone to identify an interrupt when a voice audio (e.g., of the participating user) is detect, such techniques may be biased toward not interrupting audio presentations of the dialog driven system.

While such techniques can detect voice audio, whether the voice audio should result in an interruption of the audio presentation of dialog driven system audio may further depend on detecting whether the voice audio was actually intended for the dialog driven system. Instead of relying only upon voice audio detection, techniques that can differentiate between voice audio directed to the dialog driven system and voice audio not directed to dialog driven system, can greatly improve the performance of interruption handling. For example, undirected voice audio (e.g., speech like 'user to someone in the background', 'user talking to themselves', 'misclassified background speech') can be classified as a false interruption, which can remove user frustration in certain scenarios. To differentiate between voice audio directed to the dialog driven system and voice audio not directed to dialog driven system, context inclusive interruption handling may be implemented, as discussed in detail below, in various embodiments.

FIG. 1A illustrates a logical block diagram of context inclusive interruption handling for dialog driven systems, according to some embodiments. Dialog driven system 100 may be implemented to provide various kinds of applications that can be executed using interactive sequences between a user communicating through client device 110 using voice dialog. For example, dialog driven system 100 may be implemented to use various communication technologies (e.g., Internet-based, telephonic-based, radio-based, etc.) which support the exchange of audio data, through a two-way audio connection (e.g., a Voice Over Internet Protocol (VOIP)). In order to perform various operations or functions, dialog driven system 100 may prompt and respond to various voice audio data provided via client device 110 to dialog driven system 100. As noted earlier, client 110 may include small-footprint sensor-containing devices such as smart phones, wearable devices, personal assistant devices and various other "Internet of Things" (IoT) devices, mobile phones or other mobile computing devices, desktop or other non-mobile computing devices, or other devices capable of capturing and presenting audio data as part of an interaction sequence implemented by dialog driven system 100. In some embodiments, dialog driven system 100 may be stand alone system, or may be implemented or hosted as part of a provider network service, like dialog driven application management service 210 in FIG. 2 discussed below.

Figure 1B:
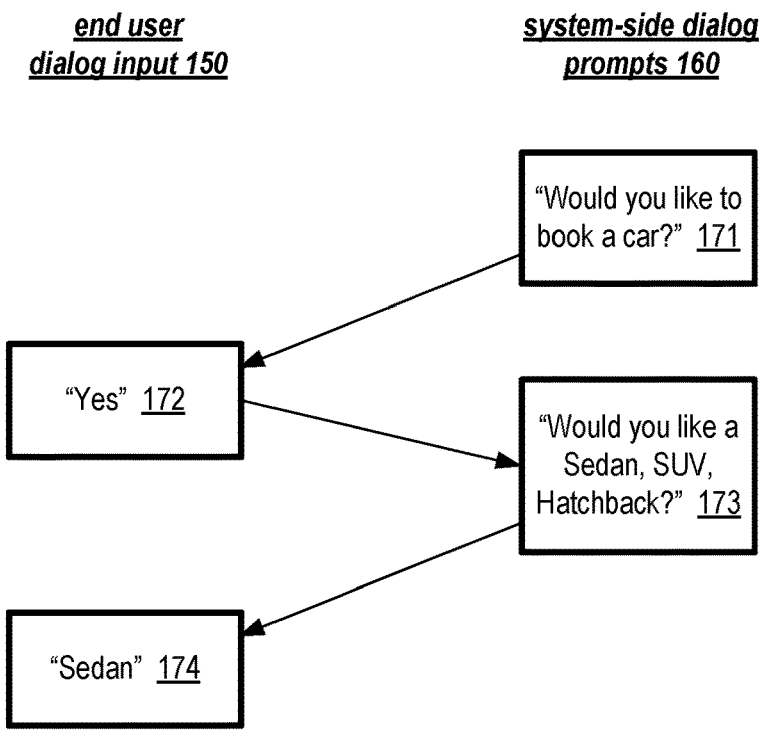
FIG. 1B illustrates an interaction sequence without interruption, according to some embodiments.

Some interactions between dialog driven system 100 and client 110 may be interrupt free. For example, FIG. 1B illustrates an interaction sequence without interruption, according to some embodiments. System-side dialog prompts 160 may provide for audio presentation "Would you like to book a car," as indicated at 171. An end user 150 through a client device, such as client 100, may respond with input "Yes" as indicated at 172. System-side dialog prompts 160 may next provide for audio presentation "Would you like a Sedan, SUV, Hatchback?", as indicated at 173. Then, the end user 150 may respond "Sedan", as indicated at 174.

Figure 1C:
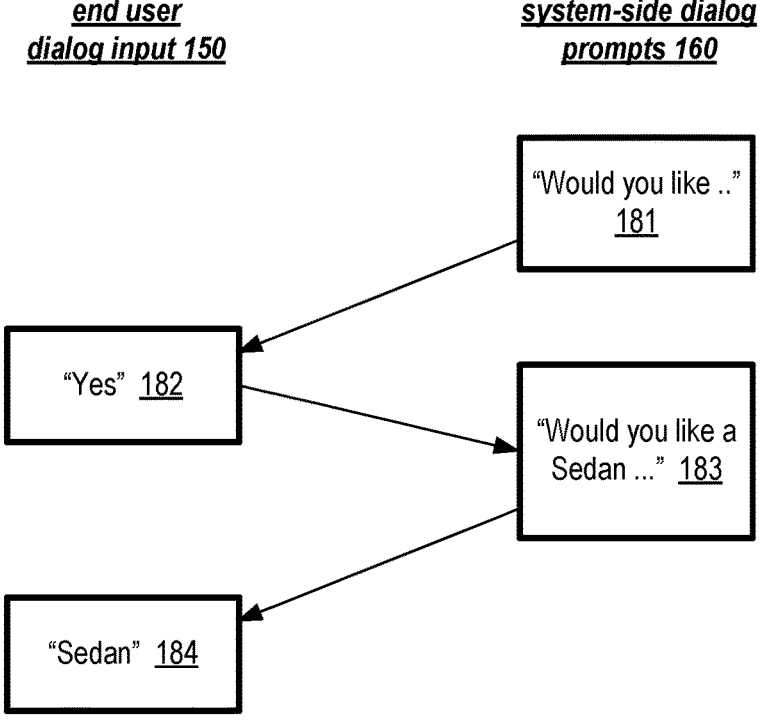
FIG. 1C illustrates an interaction sequence with interruption, according to some embodiments.

Some interactions between dialog driven system 100 and client 110 may include interrupts. For example, FIG. 1C illustrates an interaction sequence with interruption, according to some embodiments. System-side dialog prompts 160 may provide for audio presentation of "Would you like," interrupted after like, as indicated at 181 by end user 150 through a client device, such as client 100, responding with input "Yes" as indicated at 182 before prompt 181 completes. System-side dialog prompts 160 may next provide for audio presentation "Would you like a Sedan", as indicated at 183. Which again may not complete, but instead be interrupt by the voice "Sedan", as indicated at 184.

As part of an interaction sequence, dialog driven system 100 may generate and provide dialog for audio presentation, as indicated at 112. For example, one or more sentences may be presented (e.g., played through client device 110 playback components, speakers or other audible playback components) in order to elicit or confirm information received via audio input from client 110. In some embodiments, client 110 may implement client-side components or features of dialog driven system 100 which may interpret network commands to perform dialog generated at dialog driven system (not illustrated). As indicated at 114, audio during presentation 112, may be provided from client 110 to dialog driven system 100.

Dialog driven system 100 may implement voice audio detection stage 120, in various embodiments. Voice audio detection stage 120 may be a trained machine learning model which may, for example, classify input audio data as human speech. Other audio data which is received (e.g., also captured via a microphone or other audio data capture at client 110) and not classified as human speech (e.g., classified as "not human speech" or classified as some other type of sound) may be disregarded for further interruption handling processing.

As indicated at 120, voice audio detection stage 120 may detect and provide detected voice audio for context inclusive post-processing stage 130. Context inclusive post-processing stage 130 may implement various encoders or other techniques for including context of the voice audio to improve an interruption classification determination made for the detected voice audio data 122, as discussed in detail below with regard to FIGS. 4-8. For example, context inclusive post-processing stage 130 may implement an acoustic encoder 132, which may be pre-trained and created with self-supervised fine-tuning to generate an encoding of detected voice audio that can capture various contextual nuances of the sound of the voice audio which may indicate whether an interruption is true or false. Other context inclusive encoder(s) 134 may be implemented instead of or in combination with acoustic encoder 132. Interruption classifier 136 may be trained to accept acoustic encodings (as well as other inclusive context encodings) in order to predict a classification for given detected voice audio 122 (e.g., true or false interruption).

As indicated at 138, the interruption classification for the detected voice audio may be provides to interruption handling 140. Interruption handling 140 may take action according to the interruption classification. For example, for false interruptions, interruption handling 140 may cause dialog driven system 100 to ignore or otherwise disregard the detected voice audio. As indicated at 142, for interruptions classified as true, actions to cause dialog driven system 100 to stop audio presentation for true interruptions may be performed.

Please note that the previous description of context inclusive interruption handling for dialog driven systems is a logical illustration and thus is not to be construed as limiting as to the implementation of a dialog driven system, client, or various other illustrated features.

This specification continues with a general description of a provider network that implements multiple different services, including a dialog driven application management service, which may implement context inclusive interruption handling for dialog driven systems. Then various examples of, including different components/modules, or arrangements of components/module that may be employed as part of implementing the services are discussed. A number of different methods and techniques to implement context inclusive interruption handling for dialog driven systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
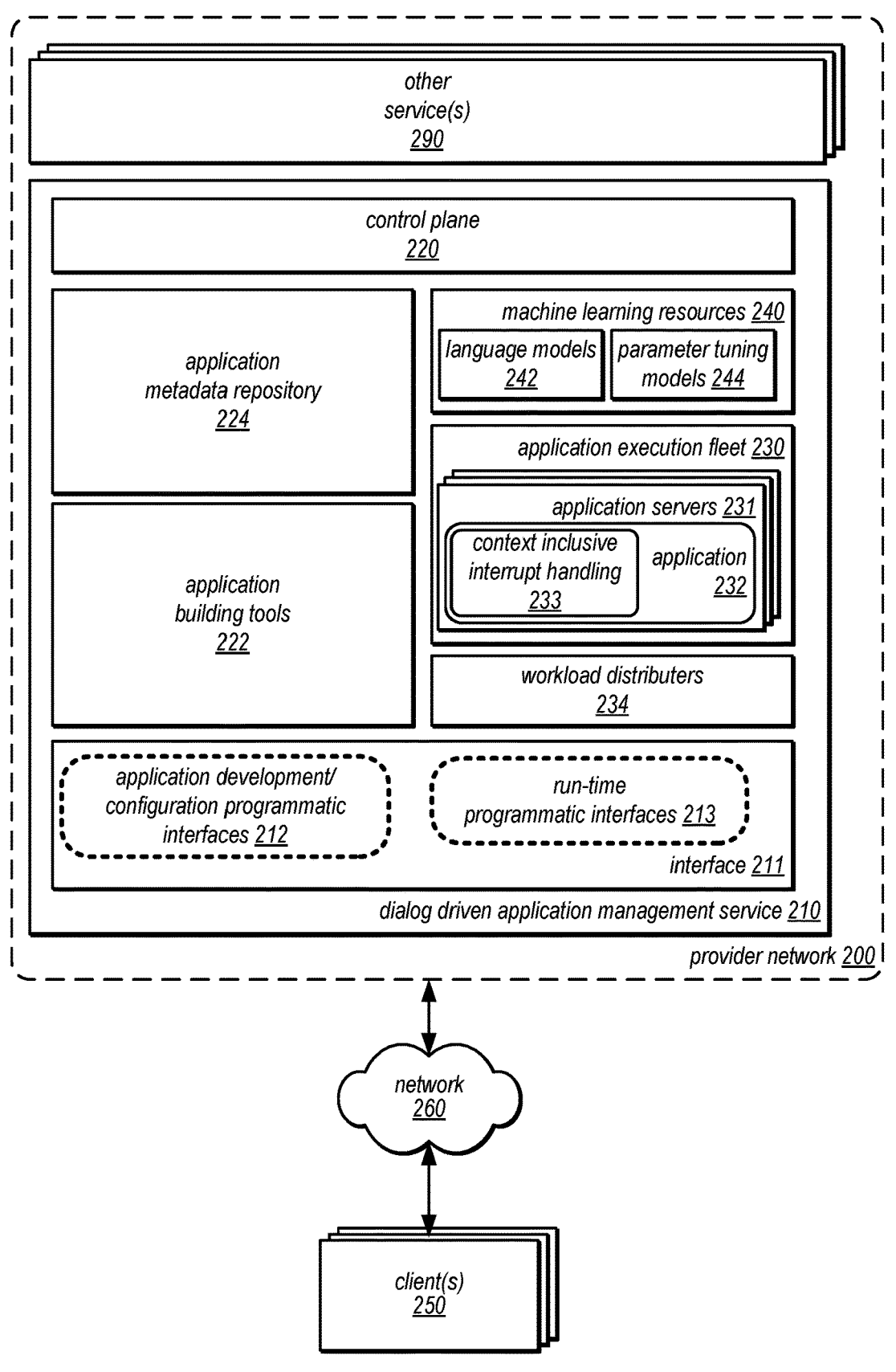
FIG. 2 illustrates an example provider network that may implement an dialog driven application management service that implements context inclusive interruption handling for dialog driven systems, according to some embodiments.

FIG. 2 illustrates an example provider network that may implement an dialog driven application management service that implements context inclusive interruption handling for dialog driven systems, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as dialog driven application management service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of dialog driven application management service 210 may be implemented by a particular node or may be distributed across several nodes. In some embodiments, a given node may implement the functionality of more than one service system component (e.g., more than one data store component).

Dialog driven application management service 210 may implement interface 211 to allow clients (e.g., client(s) 250 or clients implemented internally within provider network 200, such as a client application hosted on another provider network service like an event driven code execution service or virtual compute service) to interact with dialog driven application management service. Interface 211 may be one or more a graphical user interfaces, programmatic interfaces that implements Application Program Interfaces (APIs) and/or a command line interfaces).

In some embodiments, interface 211 may be broadly classified into application development and configuration programmatic interfaces 212 and run-time programmatic interfaces 213. The application development and configuration programmatic interfaces 212 may be used by application owners and developers to create and provide preferred configuration settings for various dialog-driven applications which are to be executed using the application execution fleet 230, machine learning resources 240, and/or external task fulfillment resources, in various embodiments.

Application owners may interact with the dialog driven application management service via the interfaces 212 from a variety of application owner devices (e.g., on clients 250) in different embodiments, such as desktop computers, laptops, mobile devices and the like. Information about the dialog-driven applications, such as logical descriptors of the applications, program code (e.g., in source code or executable form), configuration settings for various stages or interaction categories of the applications, may be stored in an application metadata repository 224, in at least some embodiments.

End users (also referred to as clients) of dialog driven applications may interact with the applications via run-time programmatic interfaces 213 in the depicted embodiment. For example, the end users may provide input in the form of audio signals, to various sensors at end user devices (e.g., on clients 250). A variety of end user devices may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at dialog driven application management service 210 client-side components at the end user devices, and then representations of the end user-generated input may be transmitted to the dialog driven application management service 210 from the client-side components in the depicted embodiment via run-time programmatic interfaces 213. In some implementations, a client-side component may comprise one or more processes or threads of execution.

Depending on the type of action the end user wishes to perform using the dialog-driven application, several interactions with the dialog driven application management service 210 may be required, e.g., over one or more connections established between a client-side component and one or more application servers 231 in at least some embodiments. A given interaction may, for example, comprise transmission of a set of user-generated input to the application server, analysis of the user-generated initiated by the server (and performed, for example, using language models 242), and a response provided to the end user from the server. In at least some embodiments, one or more resources external to the dialog driven application management service may be used by servers 231 to initiate tasks of a dialog-driven application after a set of parameters for the tasks have been obtained from the user-generated input (e.g., implementing resources in other service(s) 290). Such tasks may include, for example, retrieval of requested bank or credit card information from a source such as a financial organization's database, ordering of an item from a catalog, and so on. External task fulfillment resources utilized by the servers 231 may include, for example, a dynamically-provisioned event driven computing service of provider network 200, other computing or storage services of a cloud computing environment, resources located at data centers of the application owners, and so on. The workload distributors 234, comprising one or more computing devices, may be responsible for selecting the particular server 231 in fleet 230 with which a given client-side component is to be connected, e.g., upon receiving a connection establishment request from the client-side component in various embodiments.

Dialog driven application management service 210 may implement a control plane 220 to perform various control operations to implement the features of dialog driven application management service 210. For example, control plane 220 may monitor the health and performance of requests at different components workload distributers, application servers 231, machine learning resources 240, application building tools 222, and application metadata repository 224 (e.g., the health or performance of various nodes implementing these features of dialog driven application management service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments.

Dialog driven application management service 210 may implement application building tools 222, in some embodiments. In various embodiments, representations or descriptors of dialog-driven applications involving one or more categories of interactions with end users, and actions to be initiated based on analysis of end user-generated inputs, may be obtained at the dialog driven application management service. Such representations may, for example, be generated as a result of the use of one or more easy-to-use application building tools 222 by application owners. The application building tools 222, may, for example, include a multi-step dialog setup coordinator responsible for enabling application developers to specify the steps of the interactions needed to determine parameter values for fulfilling various application intents, as well as a fulfillment integration coordinator responsible for inserting the appropriate hooks for invoking resources for implementing the intents into the dialog-driven application. When creating an application using such tools 222, an application owner may indicate the external task fulfilment resources to be used (if any) for the application, such as a particular function to be invoked using a dynamically-provisioned event driven computing service, and this information may be stored as part of the application descriptor or representation. Several types of configuration settings for individual categories of the interactions (or for groups of categories) may also be obtained at the dialog driven application management service 210, e.g., via one or more programmatic interfaces 212 and/or via the tools 222 in at least some embodiments. For example, an application owner may indicate that a first category of interactions of an application is to be implemented in an interruptible mode, while a second category is to be implemented in an uninterruptible mode. In some cases, various timing parameters may be specified to enable DAMS servers to determine when a particular set of user-generated input is to be considered complete, when to prompt the end user for initial input of an interaction category, and so on.

Dialog driven application management service 210 may implement machine learning resources 240. Machine learning resources 240 may be utilized not just to analyze and interpret user-generated input, but also to automatically tune some or all of the configuration settings chosen for dialog-driven applications. For example, in some embodiments, one or more machine learning-based parameter tuning models 244 may analyze user-generated input and server-generated responses of a particular dialog-driven application, collected (after obtaining the permissions of the end users via an opt-in interface) over some period of time. Such analysis may reveal, for example, statistical distributions of such interaction attributes as the number of times end users tend to interrupt server presentation of output, the durations of initial silences of user utterances, how often end users tend to switch between communication formats such as audio versus text versus dual tone multi frequency (DTMF) for different interaction categories, and so on. Using such data and the parameter tuning models 244, one or more of the configuration settings (e.g., interruptibility settings, timing parameters, etc.) of a data-driven application may be modified in some embodiments.

In various embodiments, dialog driven application management service 210 may implement application execution fleet 230 to host or otherwise implement applications 232 (e.g., built via tools 222 and hosted in dialog driven application management service 210). As part of implementing applications 232 on applications servers 231, context inclusive interrupt handling 233 may be invoked, specified, or supplied as a feature built into or utilized by applications 232. As discussed in detail above with regard to FIG. 1 and below with regard to FIGS. 3-9, context inclusive interrupt handling can identify which interruptions should cause a stop in audio presentation for a dialog, in some embodiments.

Generally speaking, clients 250 may encompass any type of client that can submit network-based requests to provider network 200 via network 260, including requests for dialog driven application management service 210 (e.g., a request to develop a dialog driven application or a run-time request to establish a dialog communication). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of dialog driven application management service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like dialog driven application management service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3 illustrates logical block diagrams of interrupt handling, according to some embodiments. Different interrupt classifications may have different results on a dialog driven application. For example, in Scenario A, no attempt may be made by a client to interrupt an audio presentation of application generated output. Client 310, for instance, may receive application generation output 301 from application 320 in its entirety before responding with user-generated input 302. Thus, no interrupt may occur.

In scenario B, a client 310 may interrupt during audio presentation of application generated output (e.g., prompts, solicitations, etc.). Application 320 may perform an initial portion 303 of application generated output, as indicated at 303. Meanwhile, client 310 may perform user-generated "interrupting input" 312 received at application 320. Application 320 may implement interrupt handling that stops presentation of a remaining portion 304 of application-generated output as a result of classifying user-generated input 312.

In scenario C, a client 310 may not interrupt during audio presentation of application generated output (e.g., prompts, solicitations, etc.). Application 320 may perform an initial portion 303 of application generated output, as indicated at 303. Meanwhile, client 310 may perform user-generated "interrupting input" 312 received at application 320. Application 320 may implement interrupt handling that continues presentation of a remaining portion 304 of application-generated output as a result of classifying user-generated input 312 as a false interrupt.

Figure 4:
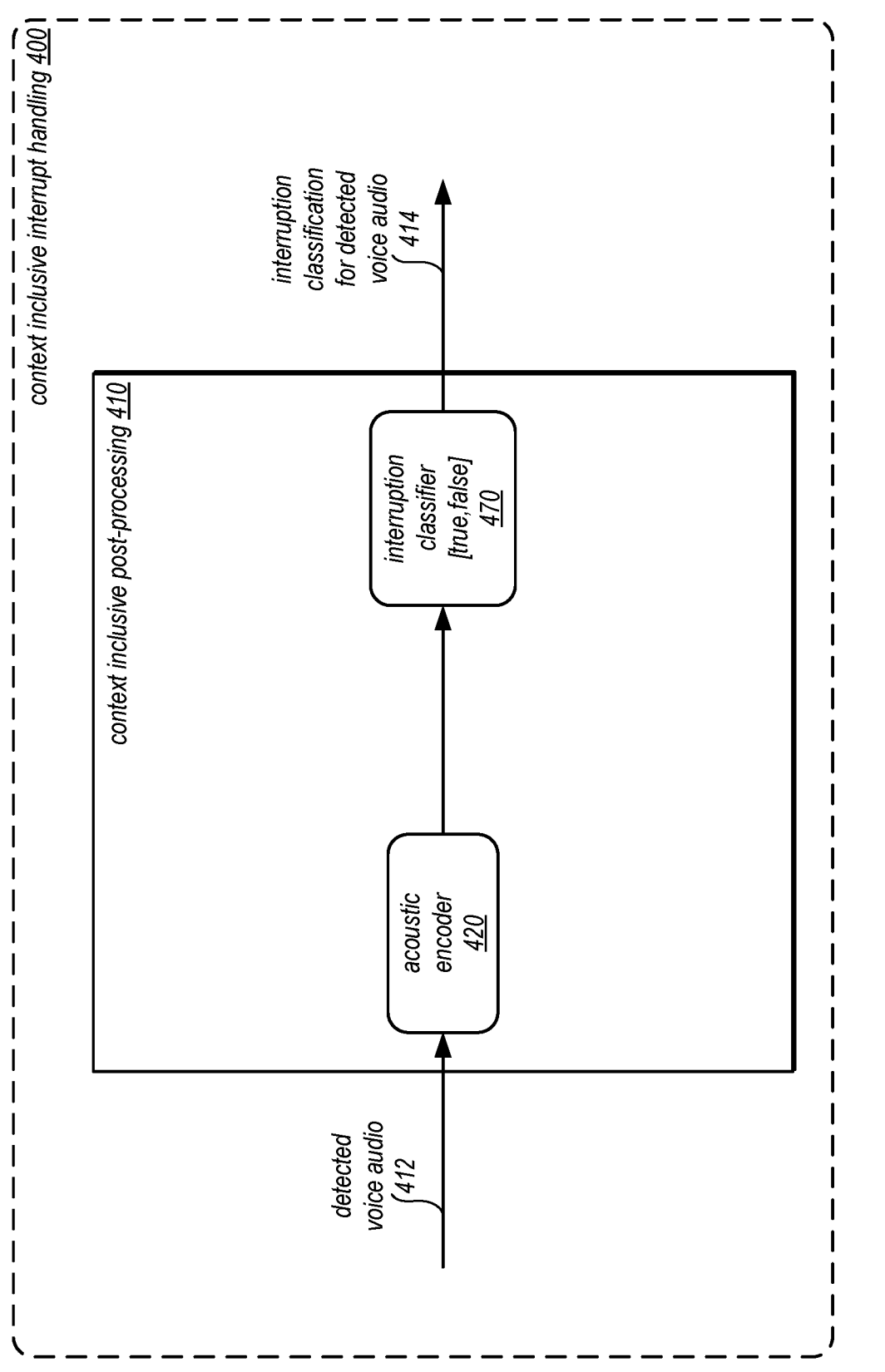
FIG. 4 illustrates a logical block diagram of context inclusive post-processing that uses an acoustic encoder, according to some embodiments.

As discussed above with regard to FIG. 1, different combinations of context-inclusive post-processing encoders may be used to classify interrupts. FIGS. 4-8 below illustrate various exemplary combinations of context-inclusive post-processing encoders may be used to classify interrupts. Other combinations not illustrated may also be implemented, in some embodiments. FIG. 4 illustrates a logical block diagram of context inclusive post-processing that uses an acoustic encoder, according to some embodiments.

Context inclusive interrupt handling 400, which may be implemented as part of a dialog driven application hosted by dialog driven application management service 210, discussed in detail above, may include context inclusive post processing stage 410, which may accept as input detected voice audio 412. As discussed above with regard to FIG. 1, various different voice audio detection techniques may be implemented, such as a trained audio classifier which may output as detected voice audio that audio data which is classified as human speech above some confidence score, value, or probability threshold (e.g., greater than 70%).

Context inclusive post-processing 410 may implement acoustic encoder 420 to encode the detected voice audio. In some embodiments, acoustic encoder 420 may be pretrained and self-supervised in fine-tuning, such as Hidden Unit Bidirectional Encoder Representations from Transforms (HuBERT) machine learning model. HuBERT, as well as other self-supervised speech representation encoders may allow for an encoding of implicit linguistic information included in the voice audio to be represented in the encoding. For example, volume changes, tone changes, enunciation changes, or various other speech adjustments that users may make (e.g., speaking lower, slower, and louder) may be included in the representation produced by the encoder. Such techniques are in contrast with speech recognition models that strip out acoustical features of speech in order to focus on recognizing the speech in the audio. In this way, this contextual information that the acoustical encoder considers can be included in inputs to an interruption classifier, such as interruption classifier 470.

As indicated at 470, interruption classifier 470 may be implemented to provide interruption classifications for detected voice audio, as indicated at 414, using the acoustic encoding as input. Various types of classification machine learning models may be used, such as Logistic Regression, k-Nearest Neighbors, Decision Trees, Support Vector Machine, Naive Bayes, Random Forest, and Gradient Boosting. Interruption classifier 470 may provide a true classification or false classification (e.g., implicitly (e.g., as a low score "true" classification) or explicitly (e.g., as high score "false" classification)) by implementing a binary classification machine learning model that labels true and false interruptions. Interruption classifier 470 may be trained to detect true and false interruptions using acoustic encoder encodings, in some embodiments.

Figure 5:
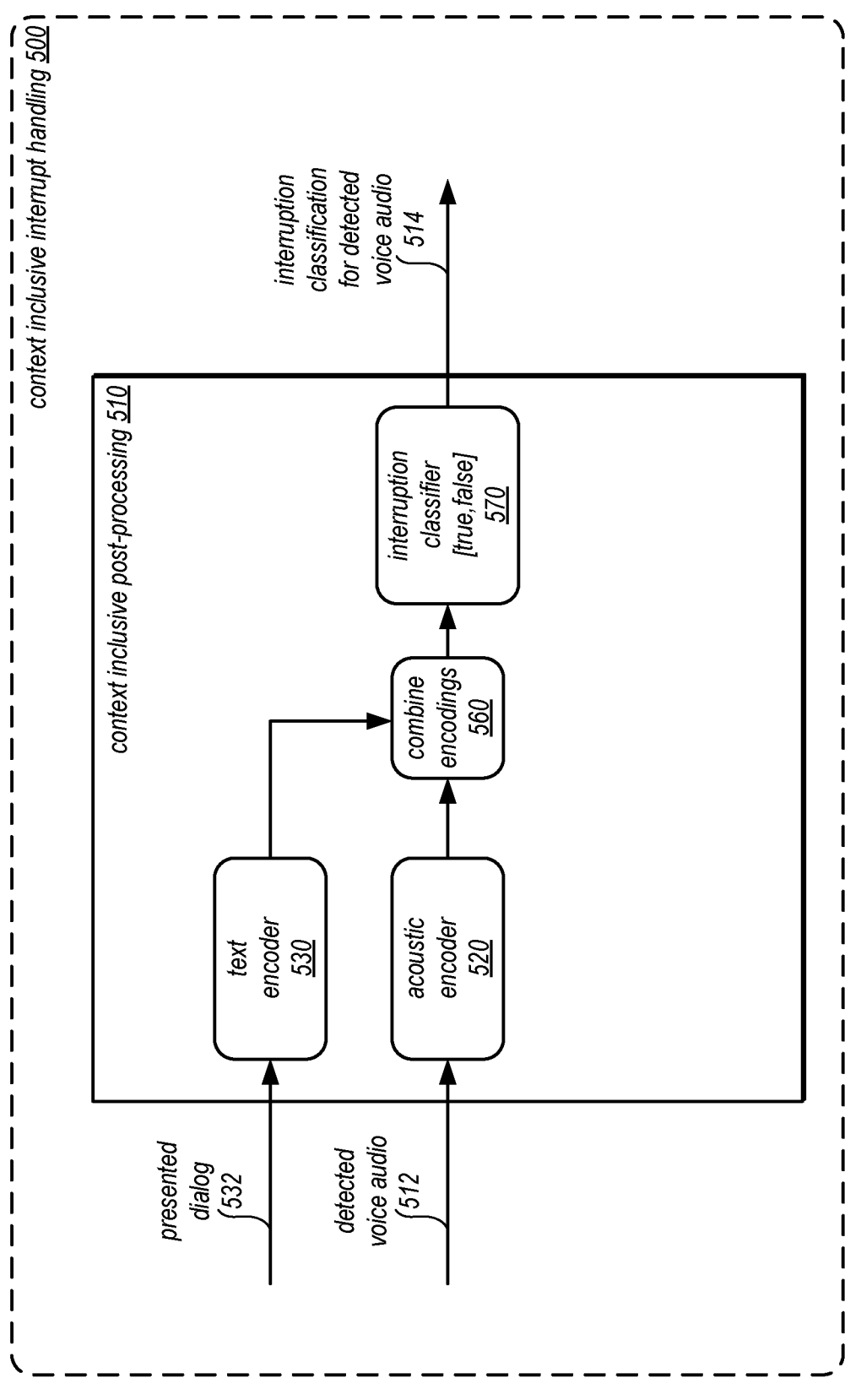
FIG. 5 illustrates a logical block diagram of context inclusive post-processing that uses a text encoder of presented dialog, according to some embodiments.

FIG. 5 illustrates a logical block diagram of context inclusive post-processing that uses a text encoder of presented dialog, according to some embodiments. Context inclusive interrupt handling 500, which may be implemented as part of a dialog driven application hosted by dialog driven application management service 210, discussed in detail above, may include context inclusive post processing stage 510, which may accept as input detected voice audio 512. As discussed above with regard to FIG. 1, various different voice audio detection techniques may be implemented, such as a trained audio classifier which may output as detected voice audio that audio data which is classified as human speech above some confidence score, value, or probability threshold (e.g., greater than 70%).

Context inclusive post-processing 510 may implement acoustic encoder 520 to encode the detected voice audio. In some embodiments, acoustic encoder 520 may be pretrained and self-supervised in fine-tuning, such as Hidden Unit Bidirectional Encoder Representations from Transforms (HuBERT) machine learning model. HuBERT, as well as other self-supervised speech representation encoders may allow for an encoding of implicit linguistic information included in the voice audio to be represented in the encoding. For example, volume changes, tone changes, enunciation changes, or various other speech adjustments that users may make (e.g., speaking lower, slower, and louder) may be included in the representation produced by the encoder. In this way, this contextual information can be included in inputs to an interruption classifier, such as interruption classifier 570.

Context inclusive post-processing 510 may also implement text encoder 530. Text encoder 530 may take as input the presented dialog 532 (e.g., the one or more sentences to be presented even if not yet presented before the detected voice audio 512) and apply a machine learning model that encodes the dialog (e.g., using a trained neural network or other natural language processing model) or other type of text encoding technique (e.g., a dictionary or other frequency-based vectorization of the dialog).

The text encoding from text encoder 530 and acoustic encoding from acoustic encoder 520 may be combined, as indicated at 560. For example, a straight combination, which appends one encoding to another as a single input vector to interruption classifier 570 may be created. In some embodiments, weighted combinations which amplify or reduce one (or more) of the encodings as part combining them may be performed. In this way, more determinative encodings can be weighted more heavily than less determinative encodings.

As indicated at 570, interruption classifier 570 may be implemented to provide interruption classifications for detected voice audio, as indicated at 514, using the combined encodings as input. Various types of classification machine learning models may be used, such as Logistic Regression, k-Nearest Neighbors, Decision Trees, Support Vector Machine, Naive Bayes, Random Forest, and Gradient Boosting. Interruption classifier 570 may provide a true classification or false classification (e.g., implicitly (e.g., as a low score "true" classification) or explicitly (e.g., as high score "false" classification)). Interruption classifier 570 may be trained to detect true and false interruptions using combined encodings, in some embodiments.

Figure 6:
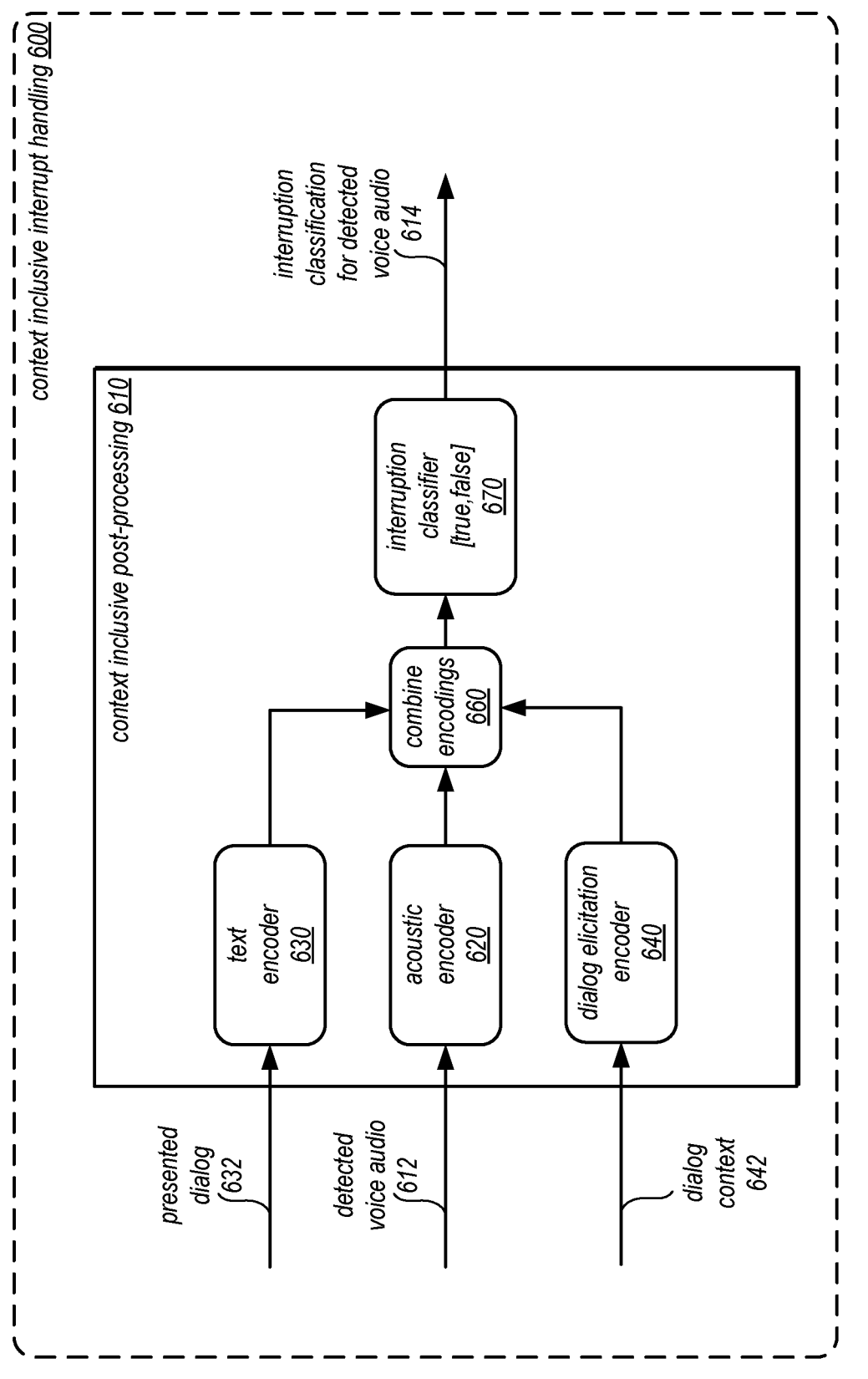
FIG. 6 illustrates a logical block diagram of context inclusive post-processing that uses a dialog elicitation encoder of dialog context, according to some embodiments.

FIG. 6 illustrates a logical block diagram of context inclusive post-processing that uses a dialog elicitation encoder of dialog context, according to some embodiments. Context inclusive interrupt handling 600, which may be implemented as part of a dialog driven application hosted by dialog driven application management service 210, discussed in detail above, may include context inclusive post processing stage 610, which may accept as input detected voice audio 612. As discussed above with regard to FIG. 1, various different voice audio detection techniques may be implemented, such as a trained audio classifier which may output as detected voice audio that audio data which is classified as human speech above some confidence score, value, or probability threshold (e.g., greater than 70%).

Context inclusive post-processing 610 may implement acoustic encoder 620 to encode the detected voice audio. In some embodiments, acoustic encoder 620 may be pretrained and self-supervised in fine-tuning, such as Hidden Unit Bidirectional Encoder Representations from Transforms (HuBERT) machine learning model. HuBERT, as well as other self-supervised speech representation encoders may allow for an encoding of implicit linguistic information included in the voice audio to be represented in the encoding. For example, volume changes, tone changes, enunciation changes, or various other speech adjustments that users may make (e.g., speaking lower, slower, and louder) may be included in the representation produced by the encoder. In this way, this contextual information can be included in inputs to an interruption classifier, such as interruption classifier 670.

Context inclusive post-processing 610 may also implement text encoder 630. Text encoder 630 may take as input the presented dialog 632 (e.g., the one or more sentences to be presented even if not yet presented before the detected voice audio 612) and apply a machine learning model that encodes the dialog (e.g., using a trained neural network or other natural language processing model) or other type of text encoding technique (e.g., a dictionary or other frequency-based vectorization of the dialog).

Context inclusive post-processing 610 may also implement dialog elicitation encoder 640, in some embodiments. Dialog context 642 may be provided for the presented dialog 632. For example, an interactive sequence implemented by an application may utilize various interaction features, such as intents and slots, which may denote various functions, parameters, or other information used to perform various operations by a dialog driven application. These features may be programmed or otherwise specified for the application, as discussed above with regard to FIG. 2. Presented dialog 632 may be prompts or other information used to elicit these features. Dialog context 642, such as the desired features to be obtained according to presented dialog 632 may be encoded at dialog elicitation encoder 640 to be included in interruption classification decisions. For example, numbers and types of elicited features may be mapped to different encoding values, which result in an dialog elicitation encoding.

The dialog elicitation encoding from dialogic elicitation encoder 640, the text encoding from text encoder 630 and acoustic encoding from acoustic encoder 620 may be combined, as indicated at 660. For example, a straight combination, which appends one encoding to another as a single input vector to interruption classifier 670 may be created. In some embodiments, weighted combinations which amplify or reduce one (or more) of the encodings as part combining them may be performed. In this way, more determinative encodings can be weighted more heavily than less determinative encodings.

As indicated at 670, interruption classifier 670 may be implemented to provide interruption classifications for detected voice audio, as indicated at 614, using the combined encodings as input. Various types of classification machine learning models may be used, such as Logistic Regression, k-Nearest Neighbors, Decision Trees, Support Vector Machine, Naive Bayes, Random Forest, and Gradient Boosting. Interruption classifier 670 may provide a true classification or false classification (e.g., implicitly (e.g., as a low score "true" classification) or explicitly (e.g., as high score "false" classification)). Interruption classifier 670 may be trained to detect true and false interruptions using combined encodings, in some embodiments.

Figure 7:
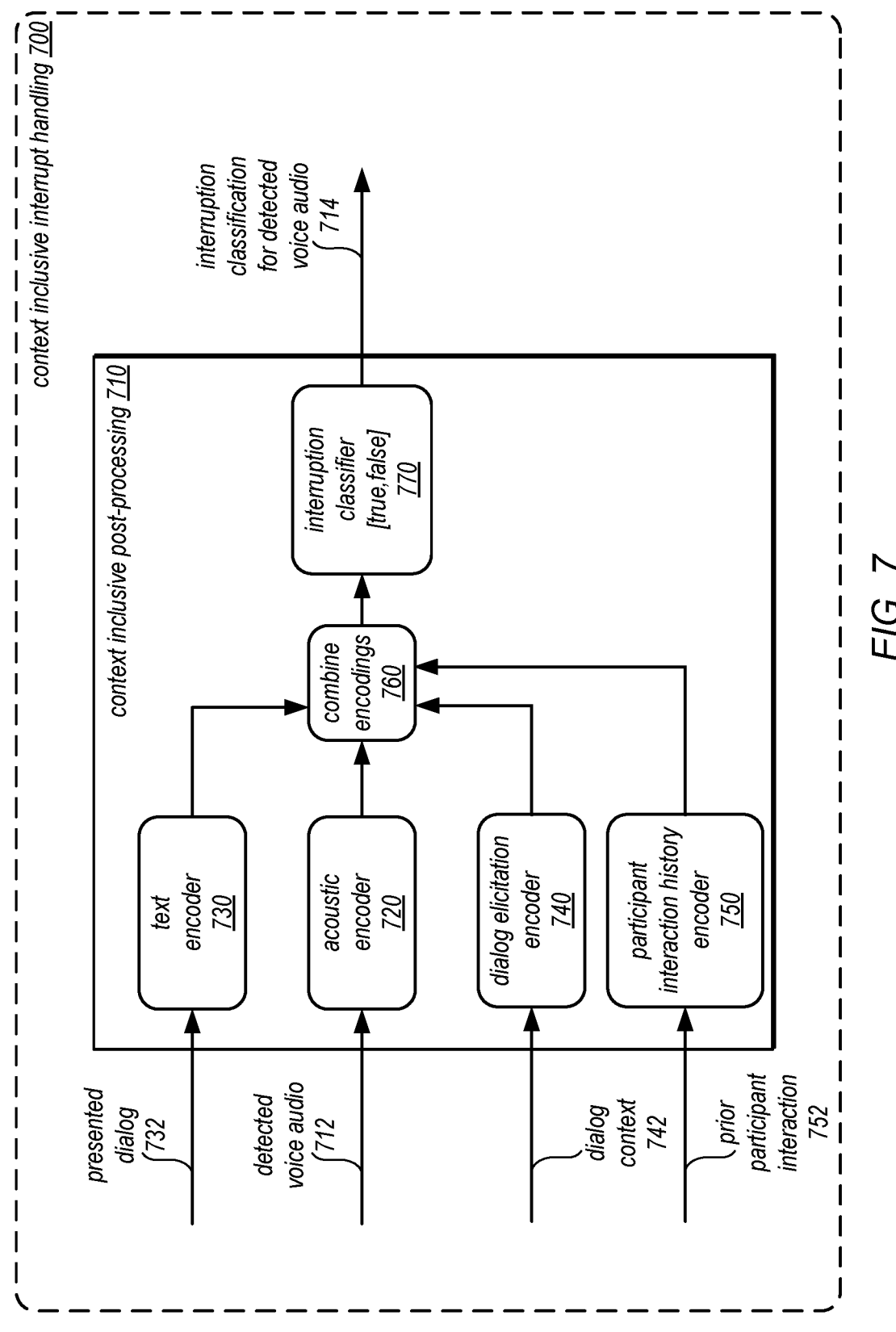
FIG. 7 illustrates a logical block diagram of context inclusive post-processing that uses a participant history encoder, according to some embodiments.

FIG. 7 illustrates a logical block diagram of context inclusive post-processing that uses a participant history encoder, according to some embodiments. Context inclusive interrupt handling 700, which may be implemented as part of a dialog driven application hosted by dialog driven application management service 210, discussed in detail above, may include context inclusive post processing stage 710, which may accept as input detected voice audio 712. As discussed above with regard to FIG. 1, various different voice audio detection techniques may be implemented, such as a trained audio classifier which may output as detected voice audio that audio data which is classified as human speech above some confidence score, value, or probability threshold (e.g., greater than 70%).

Context inclusive post-processing 710 may implement acoustic encoder 720 to encode the detected voice audio. In some embodiments, acoustic encoder 720 may be pretrained and self-supervised in fine-tuning, such as Hidden Unit Bidirectional Encoder Representations from Transforms (HuBERT) machine learning model. HuBERT, as well as other self-supervised speech representation encoders may allow for an encoding of implicit linguistic information included in the voice audio to be represented in the encoding. For example, volume changes, tone changes, enunciation changes, or various other speech adjustments that users may make (e.g., speaking lower, slower, and louder) may be included in the representation produced by the encoder. In this way, this contextual information can be included in inputs to an interruption classifier, such as interruption classifier 770.

Context inclusive post-processing 710 may also implement text encoder 730. Text encoder 730 may take as input the presented dialog 732 (e.g., the one or more sentences to be presented even if not yet presented before the detected voice audio 712) and apply a machine learning model that encodes the dialog (e.g., using a trained neural network or other natural language processing model) or other type of text encoding technique (e.g., a dictionary or other frequency-based vectorization of the dialog).

Context inclusive post-processing 710 may also implement dialog elicitation encoder 740, in some embodiments. Dialog context 742 may be provided for the presented dialog 732. For example, an interactive sequence implemented by an application may utilize various interaction features, such as intents and slots, which may denote various functions, parameters, or other information used to perform various operations by a dialog driven application. These features may be programmed or otherwise specified for the application, as discussed above with regard to FIG. 2. Presented dialog 732 may be prompts or other information used to elicit these features. Dialog context 742, such as the desired features to be obtained according to presented dialog 732 may be encoded at dialog elicitation encoder 740 to be included in interruption classification decisions. For example, numbers and types of elicited features may be mapped to different encoding values, which result in an dialog elicitation encoding.

Context inclusive post-processing 710 may also implement participant interaction history encoder 750, in some embodiments. An interactive sequence for an dialog driven application may include multiple rounds or sets of interactions between the application and an end-use. For example, as illustrated above in FIGS. 1B and 1C, multiple question and answers may be performed. In various embodiments, the past participant interaction, such as past true interruptions (or lack of true interruptions) may be indicative as to whether detective voice audio 712 is likely to be an interruption (e.g., as common interaction sequences could be remember by users and thus may be quickly passed through by interrupting with known answers. Participant interaction history encoder 750 may take the prior participant interaction information 752 (e.g., how many prior true interrupts in the interaction sequence have been identified) and map that to an encoding value to be used in combination with other encodings for interrupt classification at classifier 770.

The participant interaction history encoding from participant interaction history encoder 750, the dialog elicitation encoding from dialogic elicitation encoder 740, the text encoding from text encoder 730 and acoustic encoding from acoustic encoder 720 may be combined, as indicated at 760. For example, a straight combination, which appends one encoding to another as a single input vector to interruption classifier 770 may be created. In some embodiments, weighted combinations which amplify or reduce one (or more) of the encodings as part combining them may be performed. In this way, more determinative encodings can be weighted more heavily than less determinative encodings.

As indicated at 770, interruption classifier 770 may be implemented to provide interruption classifications for detected voice audio, as indicated at 714, using the combined encodings as input. Various types of classification machine learning models may be used, such as Logistic Regression, k-Nearest Neighbors, Decision Trees, Support Vector Machine, Naive Bayes, Random Forest, and Gradient Boosting. Interruption classifier 770 may provide a true classification or false classification (e.g., implicitly (e.g., as a low score "true" classification) or explicitly (e.g., as high score "false" classification)). Interruption classifier 770 may be trained to detect true and false interruptions using combined encodings, in some embodiments.

Figure 8:
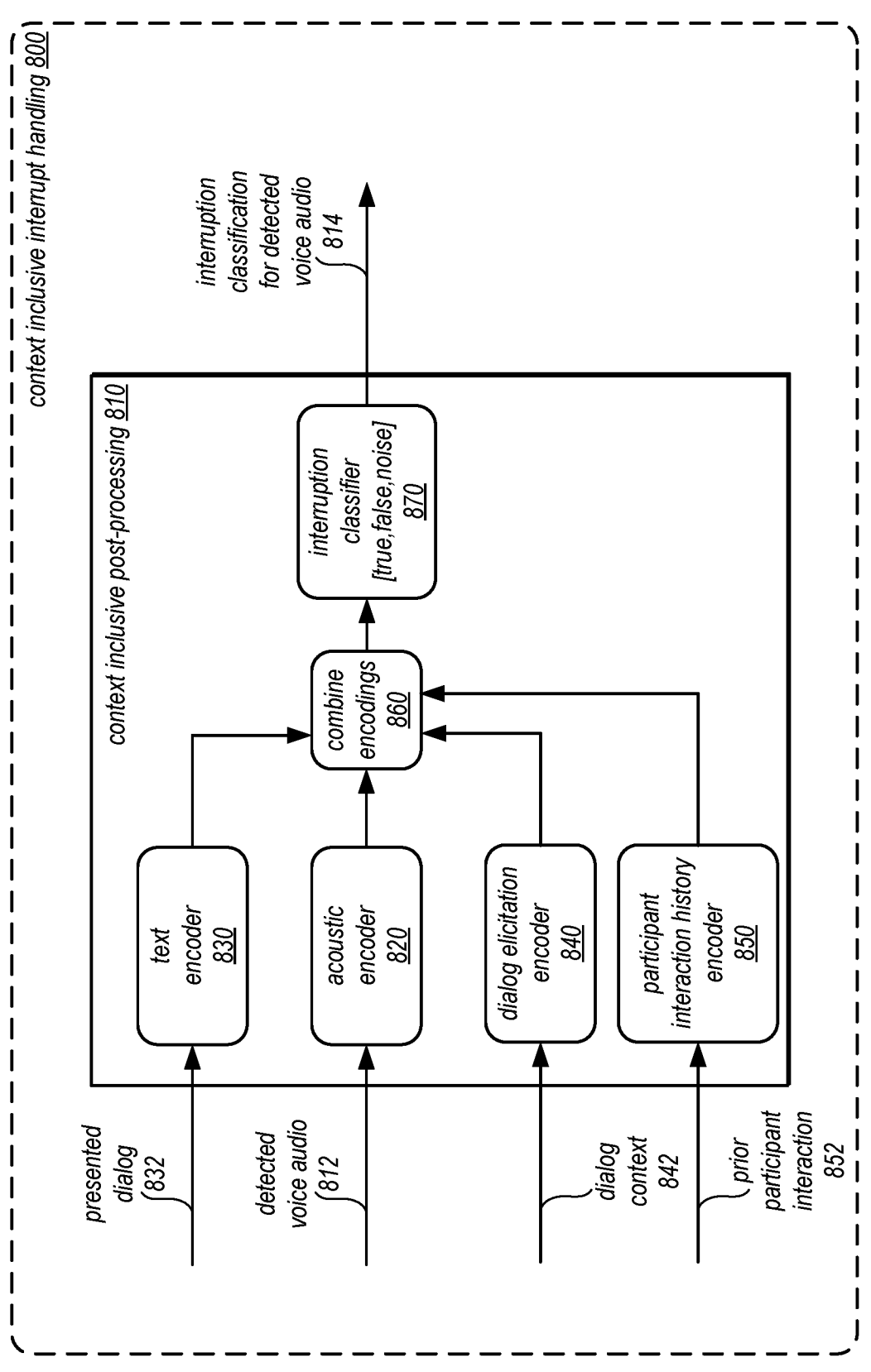
FIG. 8 illustrates a logical block diagram of context inclusive post-processing that uses an interruption classifier that includes a noise classification, according to some embodiments.

FIG. 8 illustrates a logical block diagram of context inclusive post-processing that uses an interruption classifier that includes a noise classification, according to some embodiments. Context inclusive interrupt handling 800, which may be implemented as part of a dialog driven application hosted by dialog driven application management service 210, discussed in detail above, may include context inclusive post processing stage 810, which may accept as input detected voice audio 812. As discussed above with regard to FIG. 1, various different voice audio detection techniques may be implemented, such as a trained audio classifier which may output as detected voice audio that audio data which is classified as human speech above some confidence score, value, or probability threshold (e.g., greater than 80%).

Context inclusive post-processing 810 may implement acoustic encoder 820 to encode the detected voice audio. In some embodiments, acoustic encoder 820 may be pretrained and self-supervised in fine-tuning, such as Hidden Unit Bidirectional Encoder Representations from Transforms (HuBERT) machine learning model. HuBERT, as well as other self-supervised speech representation encoders may allow for an encoding of implicit linguistic information included in the voice audio to be represented in the encoding. For example, volume changes, tone changes, enunciation changes, or various other speech adjustments that users may make (e.g., speaking lower, slower, and louder) may be included in the representation produced by the encoder. In this way, this contextual information can be included in inputs to an interruption classifier, such as interruption classifier 870.

Context inclusive post-processing 810 may also implement text encoder 830. Text encoder 830 may take as input the presented dialog 832 (e.g., the one or more sentences to be presented even if not yet presented before the detected voice audio 812) and apply a machine learning model that encodes the dialog (e.g., using a trained neural network or other natural language processing model) or other type of text encoding technique (e.g., a dictionary or other frequency-based vectorization of the dialog).

Context inclusive post-processing 810 may also implement dialog elicitation encoder 840, in some embodiments. Dialog context 842 may be provided for the presented dialog 832. For example, an interactive sequence implemented by an application may utilize various interaction features, such as intents and slots, which may denote various functions, parameters, or other information used to perform various operations by a dialog driven application. These features may be programmed or otherwise specified for the application, as discussed above with regard to FIG. 2. Presented dialog 832 may be prompts or other information used to elicit these features. Dialog context 842, such as the desired features to be obtained according to presented dialog 832 may be encoded at dialog elicitation encoder 840 to be included in interruption classification decisions. For example, numbers and types of elicited features may be mapped to different encoding values, which result in an dialog elicitation encoding.

Context inclusive post-processing 810 may also implement participant interaction history encoder 850, in some embodiments. An interactive sequence for an dialog driven application may include multiple rounds or sets of interactions between the application and an end-use. For example, as illustrated above in FIGS. 1B and 1C, multiple question and answers may be performed. In various embodiments, the past participant interaction, such as past true interruptions (or lack of true interruptions) may be indicative as to whether detective voice audio 812 is likely to be an interruption (e.g., as common interaction sequences could be remember by users and thus may be quickly passed through by interrupting with known answers. Participant interaction history encoder 850 may take the prior participant interaction information 852 (e.g., how many prior true interrupts in the interaction sequence have been identified) and map that to an encoding value to be used in combination with other encodings for interrupt classification at classifier 870.

The participant interaction history encoding from participant interaction history encoder 850, the dialog elicitation encoding from dialogic elicitation encoder 840, the text encoding from text encoder 830 and acoustic encoding from acoustic encoder 820 may be combined, as indicated at 860. For example, a straight combination, which appends one encoding to another as a single input vector to interruption classifier 870 may be created. In some embodiments, weighted combinations which amplify or reduce one (or more) of the encodings as part combining them may be performed. In this way, more determinative encodings can be weighted more heavily than less determinative encodings.

As indicated at 870, interruption classifier 870 may be implemented to provide interruption classifications for detected voice audio, as indicated at 814, using the combined encodings as input. Interruption classifier 870 may provide an expanded set of classifications in order to enrich interrupt handling responses. For example, in addition to a true classification or false classification, interruption classifier 870 may be trained to classify voice audio as noise (e.g., instead of voice audio). Thus various versions of multi-label classification machine learning models (e.g. Logistic Regression, k-Nearest Neighbors, Decision Trees, Support Vector Machine, Naive Bayes, Random Forest, and Gradient Boosting) that have 3 or more labels, as opposed to binary classification that classifies using two labels. In this way, noise-triggered modifications to audio presentations (e.g., increasing the volume, triggering additional communication features, such as sub-titles on a display), or other adjustments to account for the noise may be made. Such classifications may be made in addition to (or instead of) true/false classifications.

The previous examples of context inclusive interrupt handling provide some of the many possible combinations of features, and thus are intended to be illustrative and not intended to be limiting to other combinations of features.

Although FIGS. 2-8 have been described and illustrated in the context of a provider network implementing a dialog driven application management service, the various components illustrated and described in FIGS. 2-8 may be easily applied to other systems that implement dialog driven applications. As such, FIGS. 2-8 are not intended to be limiting as to other embodiments of context inclusive interruption handling for dialog driven systems.

Figure 9:
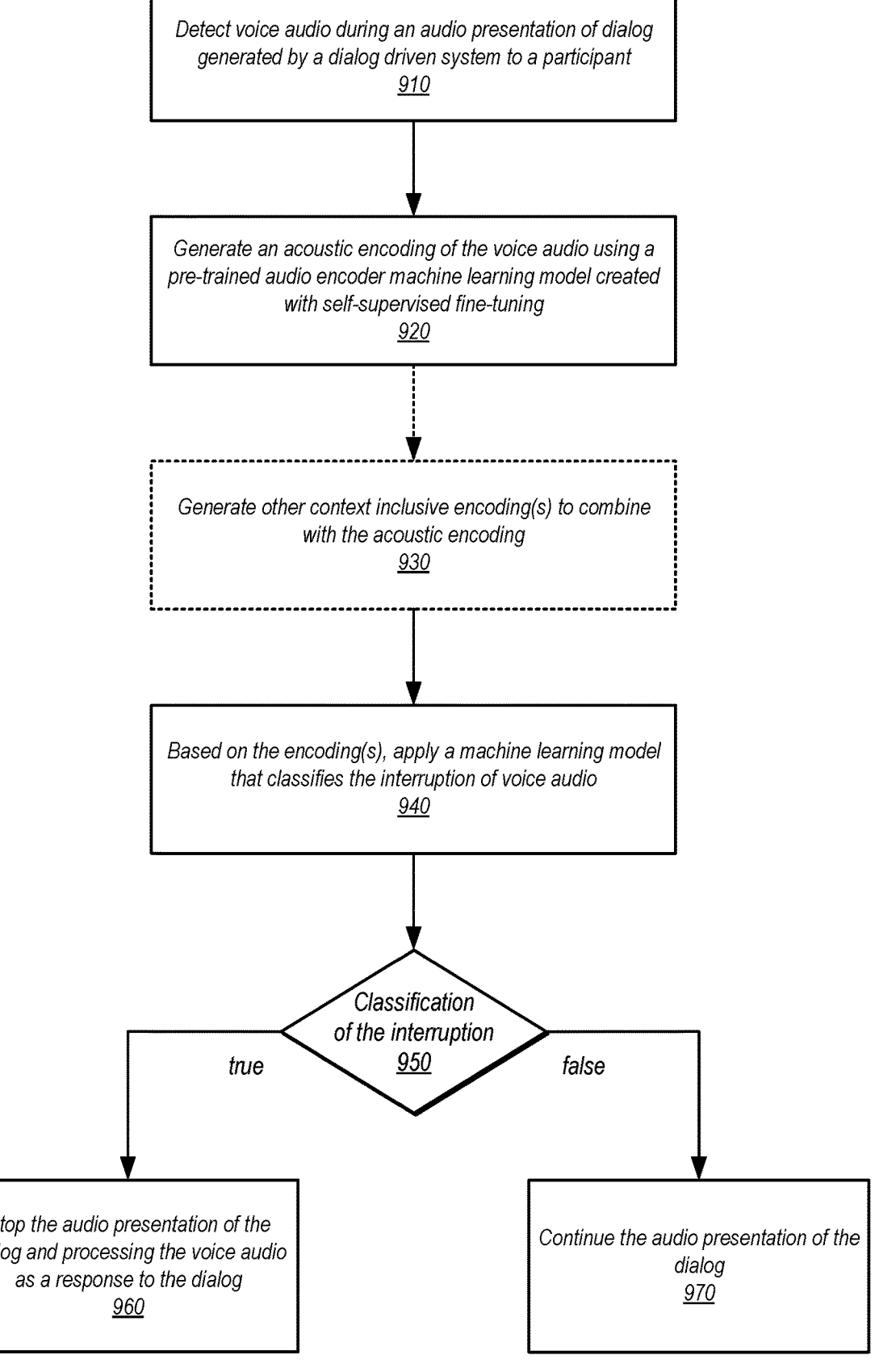
FIG. 9 illustrates a high-level flowchart of various methods and techniques to implement context inclusive interruption handling for dialog driven systems, according to some embodiments.

FIG. 9 illustrates a high-level flowchart of various methods and techniques to implement context inclusive interruption handling for dialog driven systems, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 910, voice audio may be detected during an audio presentation of dialog generated by a dialog driven system to a participant, in some embodiments. A dialog driven system may implement an interaction sequence of one (or multiple) audio exchanges with a participant through a client device (as discussed above with regard to FIG. 1). An audio presentation for one portion of the interaction sequence may be presented to the participant during which audio data captured at the client device may be communicated back to the dialog driven system. The dialog driven system may implement voice detection techniques, such as a human speech classifier, to determine that the audio data is voice audio.

As indicated at 920, an acoustic encoding of the voice audio using a pre-trained audio encoder machine learning model created with self-supervised fine-tuning, in some embodiments. For example, acoustic encoders may incorporate additional features of human speech related to pitch, tone, emphasize, direction (e.g., is a head turned away from a client device providing a different volume of speech), among other features which provide additional context for classifying the detected voice as an interrupt.

As indicated at 930, other context inclusive encoding(s) may be generated to combine with the acoustic encoding, in some embodiments. The dotted lines and arrows may represent other possible context inclusive encodings that may be combined with the acoustic encoding, in various embodiments. For example, a text encoding of presented dialog, a dialog elicitation encoding of dialog context, and/or a participant interaction history encoding may be generated for the detected voice audio.

As indicated at 940, a machine learning model that classifies the interruption of voice audio based on the encoding(s), in some embodiments. In some embodiments, the audio encoding alone may be input to the machine learning classification model. In some embodiments, multiple context inclusive encodings may be combined (e.g., straight or using a weighted scheme) and used as input to the machine learning classification model.

A true classification, as indicated by the "true" exit of 950, may occur. As indicated at 960, the audio presentation of the dialog may be stopped. Processing of the voice audio as a response to the dialog may then be performed. A false classification, as indicated by the "false" exit of 950, may occur. As indicated at 970, the audio presentation of the dialog may be continued. Other classifications and responses may occur. For example, if the voice audio is classified as noise, one or more modifications to the continued presentation of audio may be made.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
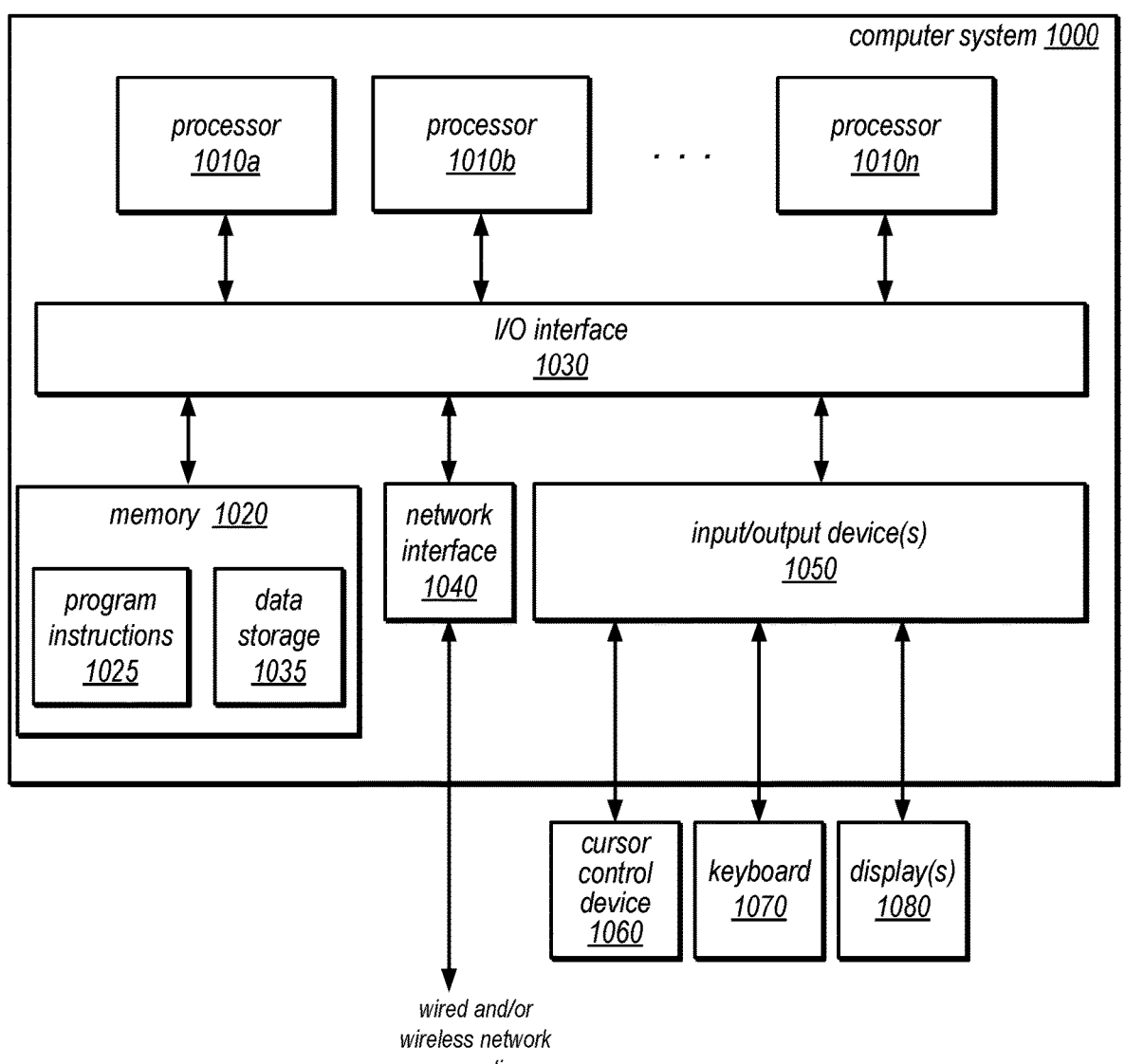
FIG. 10 illustrates an example system to implement the various methods, techniques, and systems described herein, according to some embodiments.

Embodiments of context inclusive interruption handling for dialog driven systems as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least on processor to:

during an audio presentation of dialog generated by the dialog driven system to a participant:

detecting voice audio;

responsive to detecting the voice audio, initiate a post-processing stage for the detected voice audio, the post-processing stage comprising:

generation of an acoustic encoding of the voice audio using a pre-trained audio encoder machine learning model created with self-supervised fine-tuning, wherein the acoustic encoding comprises one or more acoustic features;

generation of one or more context inclusive encodings for the voice audio comprising a text encoding of dialog not yet presented before the detected voice audio; and application of an interruption classifier machine learning model that classifies the voice audio based, at least in part, on the acoustic encoding, including as inputs to the interruption classifier machine learning model the one or more acoustic features, and the one or more context inclusive encodings, including the text encoding of dialog not yet presented before the detected voice audio, wherein the voice audio is classified as a false interruption of the dialog; and ignore the voice audio and continue the audio presentation of the dialog responsive to the false interruption classification of the voice audio.

2. The system of claim 1, wherein the memory stores further program instructions that when executed further cause the at least one processor to:

during an audio presentation of a second dialog generated by the dialog driven system to a second participant, detecting a second voice audio;

responsive to detecting the second voice audio, initiate the post-processing stage for the detected second voice audio, the post-processing stage comprising:

generation of a second acoustic encoding of the second voice audio using the pre-trained audio encoder machine learning model created with self-supervised fine-tuning; and application of the machine learning model that classifies the second voice audio based, at least in part, on the second acoustic encoding, wherein the second voice audio is classified as a true interruption of the second dialog; and stop the audio presentation of the second dialog responsive to the true interruption classification of the second voice audio to accept the second voice audio as a response to the second dialog.

3. The system of claim 1, wherein the acoustic encoding is combined with the one or more other context inclusion encodings performed as part of the post-processing stage and provided as combined input to the interruption classifier machine learning model that classifies the voice audio.

4. The system of claim 1, wherein the dialog driven system is an application hosted as part of a dialog driven application management service and wherein the dialog is generated as part of an interaction sequence specified for the application via an interface of the dialog driven application management service.

5. A method, comprising:

during an audio presentation of dialog generated by the dialog driven system to a participant:

detecting, by a dialog driven system, voice audio;

generating, by the dialog driven system, an acoustic encoding of the voice audio using a pre-trained audio encoder machine learning model created with self-supervised fine-tuning, wherein the acoustic encoding comprises one or more acoustic features;

generating, by the dialog driven system, one or more context inclusive encodings for the voice audio comprising a text encoding of dialog not yet presented before the detected voice audio;

based, at least in part, on the acoustic encoding, including as inputs to an interruption classifier machine learning model the one or more acoustic features, and the one or more context inclusive encodings for the voice audio, including the text encoding of dialog not yet presented before the detected voice audio, applying, by the dialog driven system, the interruption classifier machine learning model that classifies the voice audio as a false interruption of the dialog; and ignoring the voice audio and continuing, by the dialog driven system, the audio presentation of the dialog responsive to the false interruption classification of the voice audio.

6. The method of claim 5, further comprising combining the acoustic encoding with the one or more other context inclusive encodings, wherein the combination is provided as combined input to the machine learning model that classifies the voice audio.

7. The method of claim 6, wherein the combination is a weighted combination of the acoustic encoding and the one or more other context inclusive encodings.

8. The method of claim 5, wherein one of the one or more other context inclusion encodings is a text encoding of further dialog that was presented before the detection of the voice audio.

9. The method of claim 5, wherein one of the one or more other context inclusion encodings is an encoding indicating whether the dialog being presented is an elicitation to the participant.

10. The method of claim 5, wherein one of the one or more other context inclusion encodings is an encoding of prior participant interaction with the dialog driven system.

11. The method of claim 5, wherein the pre-trained audio encoder machine learning model created with self-supervised fine-tuning is a Hidden Unit Bidirectional Encoder Representations from Transforms (HuBERT) machine learning model.

12. The method of claim 5, further comprising:

detecting, by the dialog driven system, a second voice audio during an audio presentation of a second dialog generated by the dialog driven system to a second participant;

generating, by the dialog driven system, a second acoustic encoding of the second voice audio using the pre-trained audio encoder machine learning model created with self-supervised fine-tuning;

based, at least in part, on the second acoustic encoding, applying, by the dialog driven system, the machine learning model that classifies the second voice audio as noise; and modifying, by the dialog driven system, the audio presentation of the second dialog responsive to the noise classification of the second voice audio.

13. The method of claim 5, further comprising:

detecting, by the dialog driven system, a second voice audio during an audio presentation of a second dialog generated by the dialog driven system to a second participant;

generating, by the dialog driven system, a second acoustic encoding of the second voice audio using the pre-trained audio encoder machine learning model created with self-supervised fine-tuning;

based, at least in part, on the second acoustic encoding, applying, by the dialog driven system, the machine learning model that classifies the second voice audio as a true interruption of the second dialog; and stopping, by the dialog driven system, the audio presentation of the second dialog responsive to the true interruption classification of the second voice audio to accept the second voice audio as a response to the second dialog.

14. One or more non-transitory, computer-readable storage media, storing program instructions that when executed on or across one or more computing devices cause the one or more computing devices to implement a dialog driven system that implements:

during an audio presentation of dialog generated by the dialog driven system to a participant:

detecting voice audio;

responsive to detecting the voice audio:

generating an acoustic encoding of the voice audio using a pre-trained audio encoder machine learning model created with self-supervised fine-tuning, wherein the acoustic encoding comprises one or more acoustic features;

generating one or more context inclusive encodings for the voice audio comprising a text encoding of dialog not yet presented before the detected voice audio;

based, at least in part, on the acoustic encoding, including as inputs to an interruption classifier machine learning model the one or more acoustic features, and the one or more context inclusive encodings, including the text encoding of dialog not yet presented before the detected voice audio, applying, by the dialog driven system, the interruption classifier machine learning model that classifies the voice audio as a false interruption of the dialog; and ignoring and continuing the audio presentation of the dialog responsive to the false interruption classification of the voice audio.

15. The one or more non-transitory, computer-readable storage media of claim 14, storing further instructions that when executed on or across the one or more computing devices, cause the dialog driven system to further implement:

detecting a second voice audio during an audio presentation of a second dialog generated by the dialog driven system to a second participant;

generating a second acoustic encoding of the second voice audio using the pre-trained audio encoder machine learning model created with self-supervised fine-tuning;

based, at least in part, on the second acoustic encoding, applying the machine learning model that classifies the second voice audio as a true interruption of the second dialog; and stopping the audio presentation of the second dialog responsive to the true interruption classification of the second voice audio to accept the second voice audio as a response to the second dialog.

16. The one or more non-transitory, computer-readable storage media of claim 14, wherein one of the context inclusive encodings is a text encoding of the dialog being presented using a text encoder machine learning model; and wherein the one or more non-transitory computer-readable storage media store further instructions that when executed on or across the one or more computing devices, cause the dialog driven system to further implement:

combining the acoustic encoding with the text encoding, wherein the combination is provided as combined input to the machine learning model that classifies the voice audio.

17. The one or more non-transitory, computer-readable storage media of claim 14, wherein one of the context inclusive encodings is a dialog encoding indicating whether the dialog being presented is an elicitation to the participant; and wherein the one or more non-transitory computer-readable storage media store further instructions that when executed on or across the one or more computing devices, cause the dialog driven system to further implement:

combining the acoustic encoding with the dialog encoding, wherein the combination is provided as combined input to the machine learning model that classifies the voice audio.

18. The one or more non-transitory, computer-readable storage media of claim 14, wherein one of the context inclusive encodings is a participant history encoding indicating prior participant interaction with the dialog driven system; and wherein the one or more non-transitory computer-readable storage media store further instructions that when executed on or across the one or more computing devices, cause the dialog driven system to further implement:

combining the acoustic encoding with the participant history encoding, wherein the combination is provided as combined input to the machine learning model that classifies the voice audio.

19. The one or more non-transitory, computer-readable storage media of claim 14, wherein a weighted combination of the acoustic audio and the one or more other context inclusive encodings is provided as combined input to the machine learning model that classifies the voice audio.

20. The one or more non-transitory, computer-readable storage media of claim 14, wherein the dialog driven system is an application hosted as part of a dialog driven application management service and wherein the dialog is generated as part of an interaction sequence specified for the application via an interface of the dialog driven application management service.

* * * * *